United States Patent [19]

Gulette et al.

[11] Patent Number: 4,711,483

[45] Date of Patent: Dec. 8, 1987

[54] MOTOR VEHICLE VISOR WITH REMOVABLE MIRROR ASSEMBLY

[75] Inventors: Ronald S. Gulette, Farmington Hills; Grace M. Charen, Oxford, both of Mich.

[73] Assignee: Irvin Industries, Inc., Rochester Hills, Mich.

[21] Appl. No.: 820,078

[22] Filed: Jan. 21, 1986

[51] Int. Cl.[4] ............................................. B60J 3/00
[52] U.S. Cl. .............................. 296/97 C; 296/97 H
[58] Field of Search .............. 296/97 R, 97 B, 97 C, 296/97 H

[56] References Cited

U.S. PATENT DOCUMENTS

| | | |
|---|---|---|
| 2,097,419 | 10/1937 | Schmidt . |
| 2,231,641 | 2/1941 | Schwab . |
| 2,486,096 | 10/1949 | Axford et al. . |
| 2,673,670 | 3/1954 | Steele . |
| 3,140,781 | 7/1964 | Rothgart . |
| 3,610,680 | 10/1971 | Brady ............................ 296/97 H |
| 4,103,860 | 8/1978 | Haas et al. . |
| 4,384,740 | 5/1983 | Marrotta ........................ 296/97 H |
| 4,521,051 | 6/1985 | Cody et al. . |

FOREIGN PATENT DOCUMENTS

| | | | |
|---|---|---|---|
| 0053663 | 6/1982 | European Pat. Off. .......... 296/97 H |
| 3324169 | 1/1985 | Fed. Rep. of Germany .... 296/97 C |
| 973146 | 5/1965 | France ............................. 296/97 C |
| 2429685 | 2/1980 | France ............................. 296/97 H |

*Primary Examiner*—Robert B. Reeves
*Assistant Examiner*—Russell D. Stormer
*Attorney, Agent, or Firm*—Harness, Dickey & Pierce

[57] ABSTRACT

This invention relates to an improved sun visor assembly particularly adapted for motor vehicle applications. The sun visor assembly includes a mirror which is movable between a stowed position where it is enclosed by the visor, to a withdrawn position where it remains attached to the visor and can be used by the individual seated in the associated seat. The mirror is further completely removable from the visor in accordance with this invention so that it can be used as a hand-held mirror and can be used by other motor vehicle occupants. The visor is provided with a detent mechanism which retains the mirror in the desired stowed or withdrawn position. The entire visor assembly is configured to be aesthetically pleasing and relatively inexpensive to produce in terms of component and production costs.

8 Claims, 11 Drawing Figures

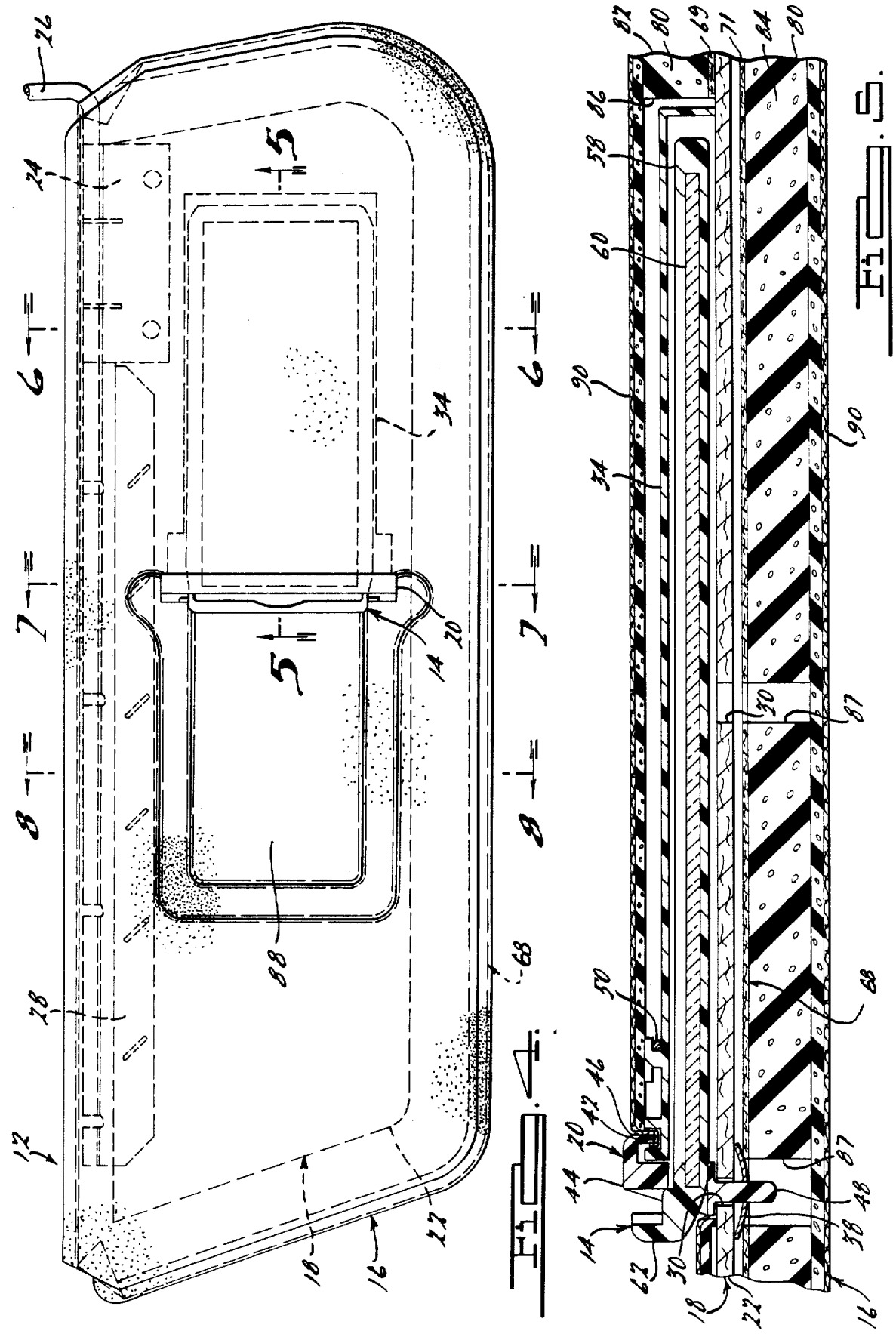

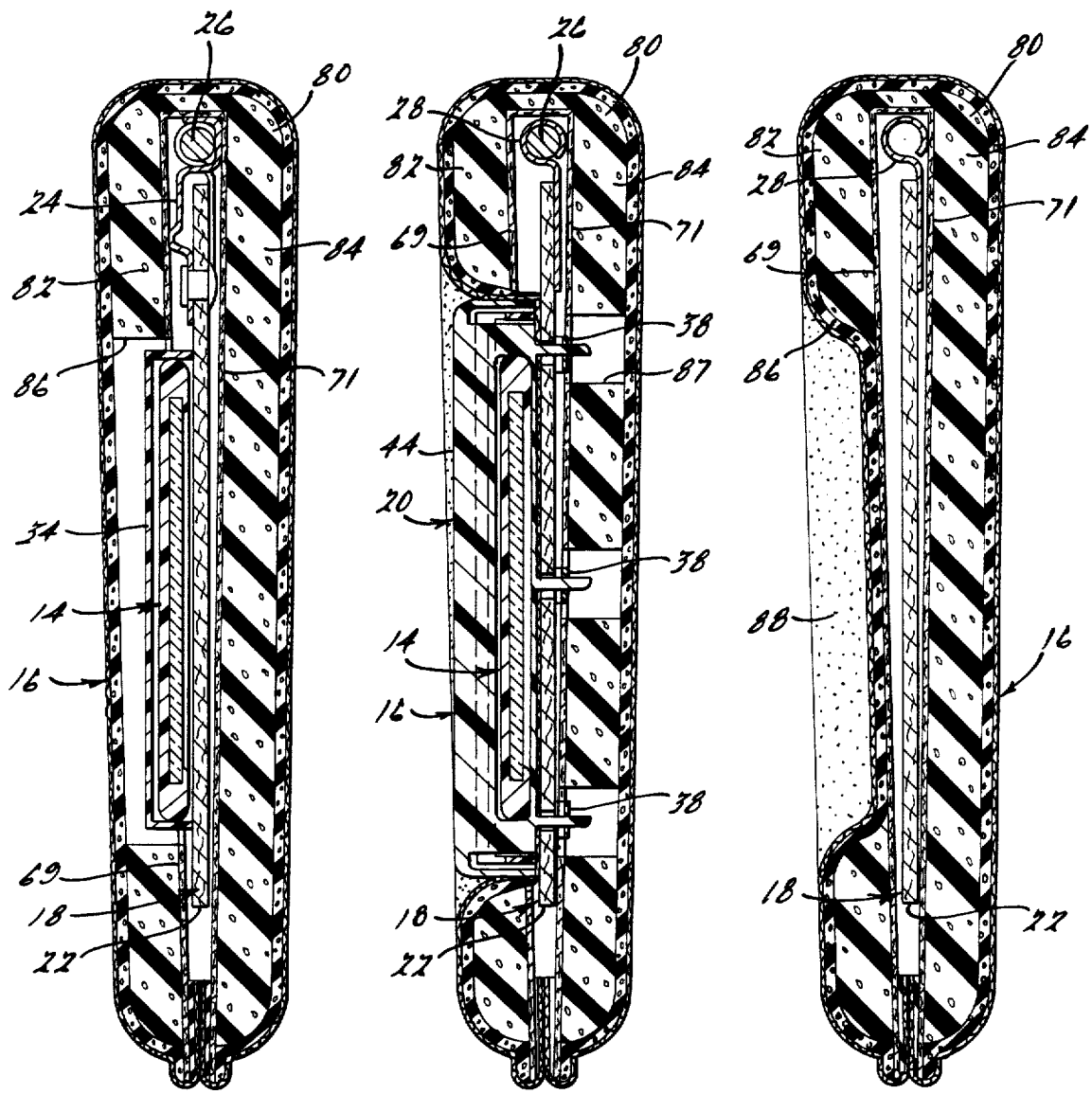

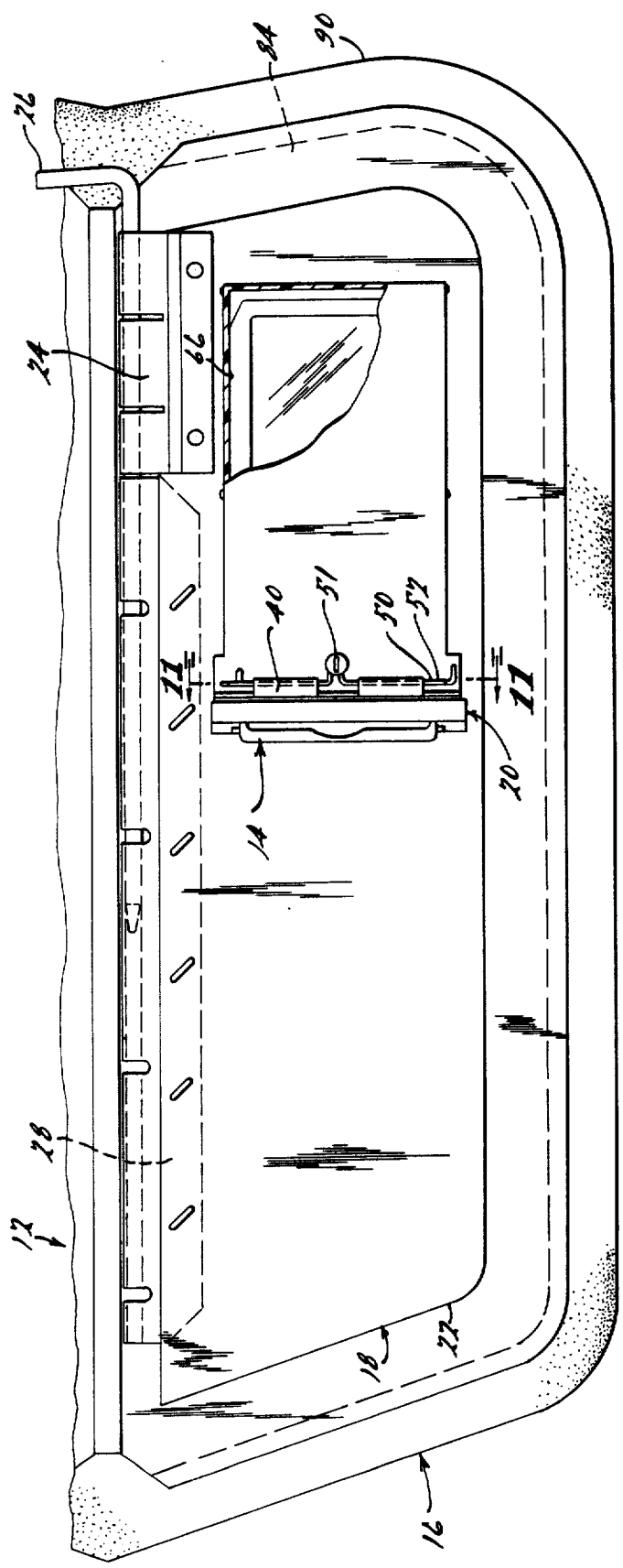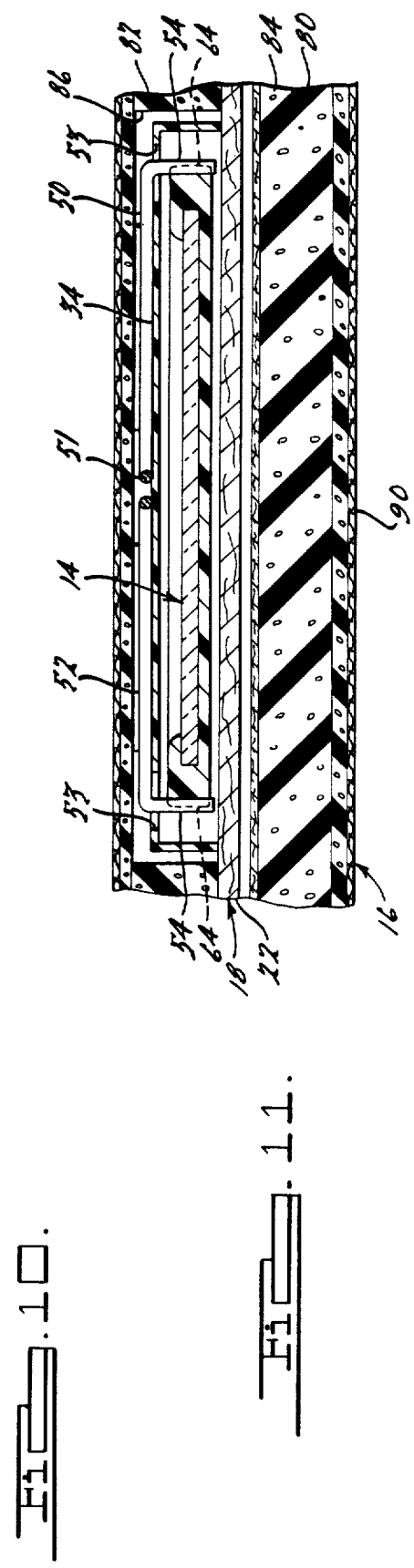

MOTOR VEHICLE VISOR WITH REMOVABLE MIRROR ASSEMBLY

BACKGROUND AND SUMMARY OF THE INVENTION

This invention relates to a sun visor assembly and particularly to one suited for use in motor vehicles and having a removable mirror.

Motor vehicles have been equipped with sun visors since the early days of automobiles. Sun visors are typically connected to the windshield header of the vehicle by an articulated joint which permits the visor to be placed in a position to shade the vehicle occupants from the direct rays of the sun or other light sources. Sun visors not only increase the comfort of driving in bright sunlight, but are also considered safety items since glare can interfere with the driver's vision of traffic and road hazards. Manufacturers of sun visors have incorporated a number of additional features into these devices. For example, some sun visors feature article holders for storing maps, combs, notepads, pens, etc. Manufacturers have provided mirrors attached to the visors which can be used by the occupants for personal grooming, etc. Often, visor mirrors include covers which enclose the mirror when not in use and may also include lights for illuminating the user.

In accordance with the teachings of the prior art, visors which include integral mirrors do not permit the mirror to be removed, and therefore, the user is constrained to using the mirror as it is attached to the visor. However, in certain instances, the user may desire a hand-held mirror or rear seat occupants may want to use the mirror. It is therefore desirable to provide a visor assembly having a removable mirror. It is further desirable to provide a mirror for a sun visor assembly which can be enclosed by the visor to protect it from dirt, abrasion, impacts, etc. Finally, as with all articles for motor vehicle applications, it is desirable to provide a structure which is aesthetically pleasing, lightweight and low in cost. The motor vehicle visor assembly in accordance with this invention provides the aforementioned desired features.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 4 is a plan view like FIG. 1 except showing the various internal components of the visor assembly in phantom lines.

FIG. 5 is a cross-sectional view taken along line 5—5 of FIG. 4.

FIG. 6 is a cross-sectional view taken along line 6—6 of FIG. 4.

FIG. 7 is a cross-sectional view taken along line 7—7 of FIG. 4.

FIG. 8 is a cross-sectional view taken along line 8—8 of FIG. 4.

FIG. 10 is a partial view of the visor assembly in accordance with this invention shown in a condition before final assembly like FIG. 9, but showing the opposite side of the visor center board.

FIG. 11 is a cross-sectional view taken along line 11—11 of FIG. 10.

DETAILED DESCRIPTION OF THE INVENTION

Figure 1:
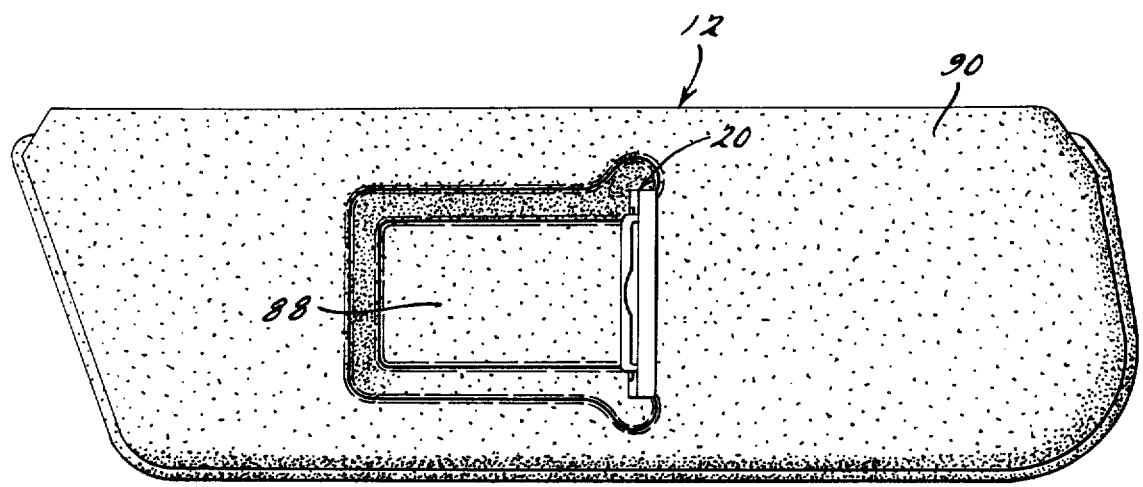
FIG. 1 is a plan view of a sun visor assembly in accordance with this invention showing the visor completely assembled and illustrating the mirror in a stowed position.
Figure 2:
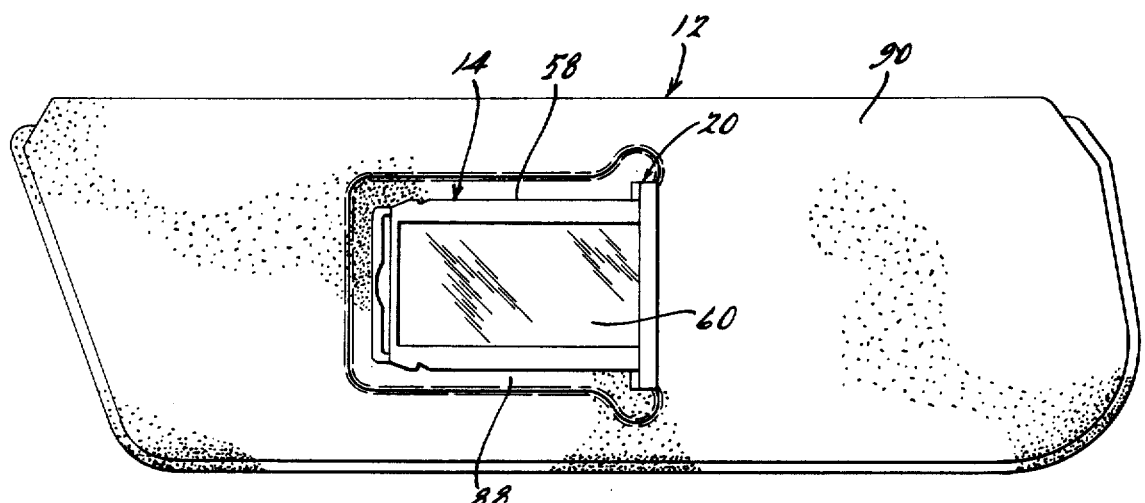
FIG. 2 is a plan view similar to FIG. 1 except showing the visor mirror in an extended position.
Figure 3:
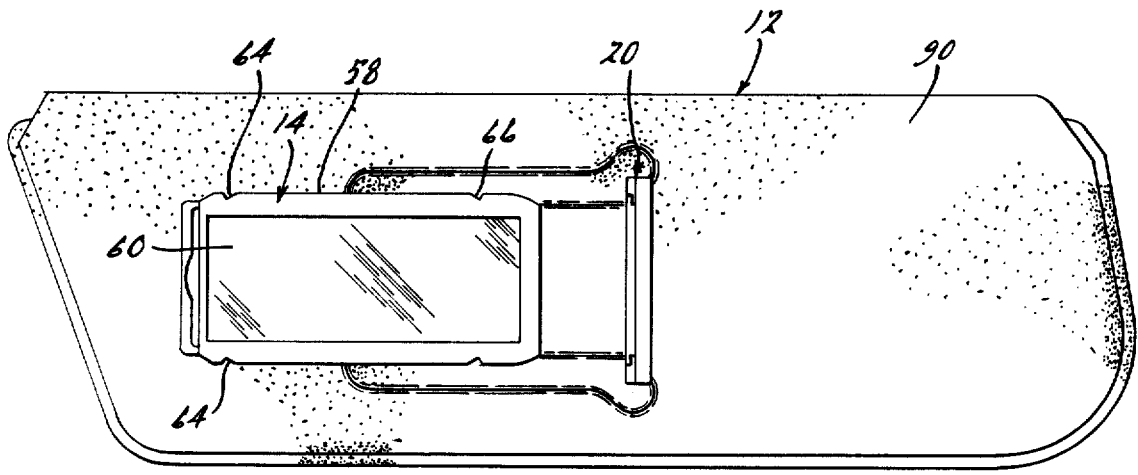
FIG. 3 is a plan view similar to FIG. 1 showing the visor mirror completely detached from the visor.

A motor vehicle visor assembly with a removable mirror in accordance with this invention is shown in each of the figures herein and is generally designated by reference number 10. Visor assembly 10 in accordance with this invention includes visor 12 and removable mirror 14. FIGS. 1, 2, and 3 illustrate three different positions of removable mirror 14 with respect to visor 12. In FIG. 1, mirror 14 is completely enclosed within visor 12. This figure represents the usual position of the components wherein mirror 14 is protected from dirt, abrasion, and damage due to impacts since it is completely enclosed and protected by visor 12. Furthermore, a desirable aesthetic appearance is provided since mirror 14 and its associated mechanisms are hidden from view. FIG. 2 illustrates mirror 14 in a withdrawn position such that it remains attached to visor 12 while providing a reflective surface for use by the occupant of that seating position for personal grooming, etc. The relative position of mirror 14 with respect to the user can be adjusted simply by moving visor 12. FIG. 3 illustrates mirror 14 completely removed from its attachment to visor 12. This capability for completely removing mirror 14 enables the mirror to be used as a hand-held mirror by the occupant of that seating position or by others in the vehicle (or outside the vehicle). When mirror 14 is no longer being used, it is preferably replaced in the stowed position shown in FIG. 1.

FIGS. 4 through 11 provide detailed views of the various individual components making up visor assembly 10 which provide the capabilities described above. Visor 12 is comprised primarily of outer board assembly 16, center board assembly 18, and mirror retainer assembly 20. Visor 12 is assembled generally in accordance with prior art techniques wherein outer board assembly 16 is produced as a one-piece unit which is bent along a center line and folded onto itself to enclose center board assembly 18, whereupon the perimeter edge of the outer board assembly is seated, thereby completing assembly of the unit.

Center board assembly 18 includes center board 22, preferably made from flat composite stock material. Detent clip 24 is fastened to center board 22 and is conformed to wrap around visor arm 26 which is connected to the associated motor vehicle. Detent clip 24 provides a desired level of friction with visor arm 26 to enable visor assembly 10 to be placed at a desired position and remain in that position. Visor hinge 28 is also attached to center board 22 along the upper edge thereof and also wraps around visor arm 26 to reinforce visor assembly 10. Visor hinge 28 and detent clip 24 are attached to center board 22 using any conventional means such as by staples, bonding, rivets, etc. Center board 22 defines a plurality of mounting holes 30 which are employed for fastening of mirror retainer assembly 20. Additional holes may be provided as gaging and machining holes useful in production and assembly of visor assembly 10.

Mirror retainer assembly 20 includes mirror housing 34, best shown in FIG. 5. Mirror housing 34 is in the shape of an open sided rectangular box and defines a plurality of extending mounting posts 36. Mirror housing 34 is positioned on center board 22 such that it defines an enclosed rectangular shaped pocket bounded by itself and the center board. Mirror housing 34 is retained in attachment to center board 22 by push-on clips 38 which frictionally engage posts 36 which pass through mounting holes 30 of center board 22. Mirror housing 34 further defines detent clip retainer 40 and channel 42 at one end thereof. Mirror guide 44 defines a slot for the insertion of mirror 14 and includes flange 46 which is positioned in channel 42 of mirror housing 34. Mirror guide 44 also defines one or more posts 48 which pass through mounting holes 30 of center board 22 and are retained by push-on clip 38. When mirror guide 44 and mirror housing 34 are attached to center board 22, they define a pocket for the insertion of mirror 14.

Now with particular reference to FIGS. 10 and 11, detent clip 50 is shown as a formed wire member having a center section 52 and a pair of ends 54. Detent clip center section 52 further defines a central loop 51 which may be staked into position onto mirror housing 34 by bonding, sonic welding, etc. The remaining portion of detent clip center section 52 is retained in position by detent clip retainer 40. Detent clip ends 54 pass through a pair of slots 53 within mirror housing 34 such that they are disposed within the interior cavity defined by the mirror housing and center board 22. Detent clip ends 54 act to engage mirror 14 as will be better described below to retain the mirror in various usage positions.

Mirror 14, best shown in FIG. 5, is defined by bezel 58 which encloses plate mirror 60. Bezel 58 defines a frame surrounding the edges and preferably the backside of the mirror plate 60. Bezel 58 further defines flange 62 which enables mirror 14 to be conveniently grasped by the user, thereby enabling it to be moved between its various positions. Bezel 58 further defines pairs of longitudinally spaced opposing notches 64 and 66. Notches 64 are located such that detent clip ends 54 engage them when mirror 14 is in the completely stowed position shown in FIG. 1 to retain the mirror in that position. Such engagement between notches 64 and detent clip 50 is shown in FIGS. 10 and 11. Notches 66 are positioned such that detent clip ends 54 engage them when mirror 14 is in the withdrawn position shown in FIG. 2. Detent clip 50 therefore further functions to maintain mirror 14 in the withdrawn position and prevents it from becoming detached from visor 12 unless the user desires to remove the mirror by overcoming the retaining force provided by detent clip 50.

Figure 9:
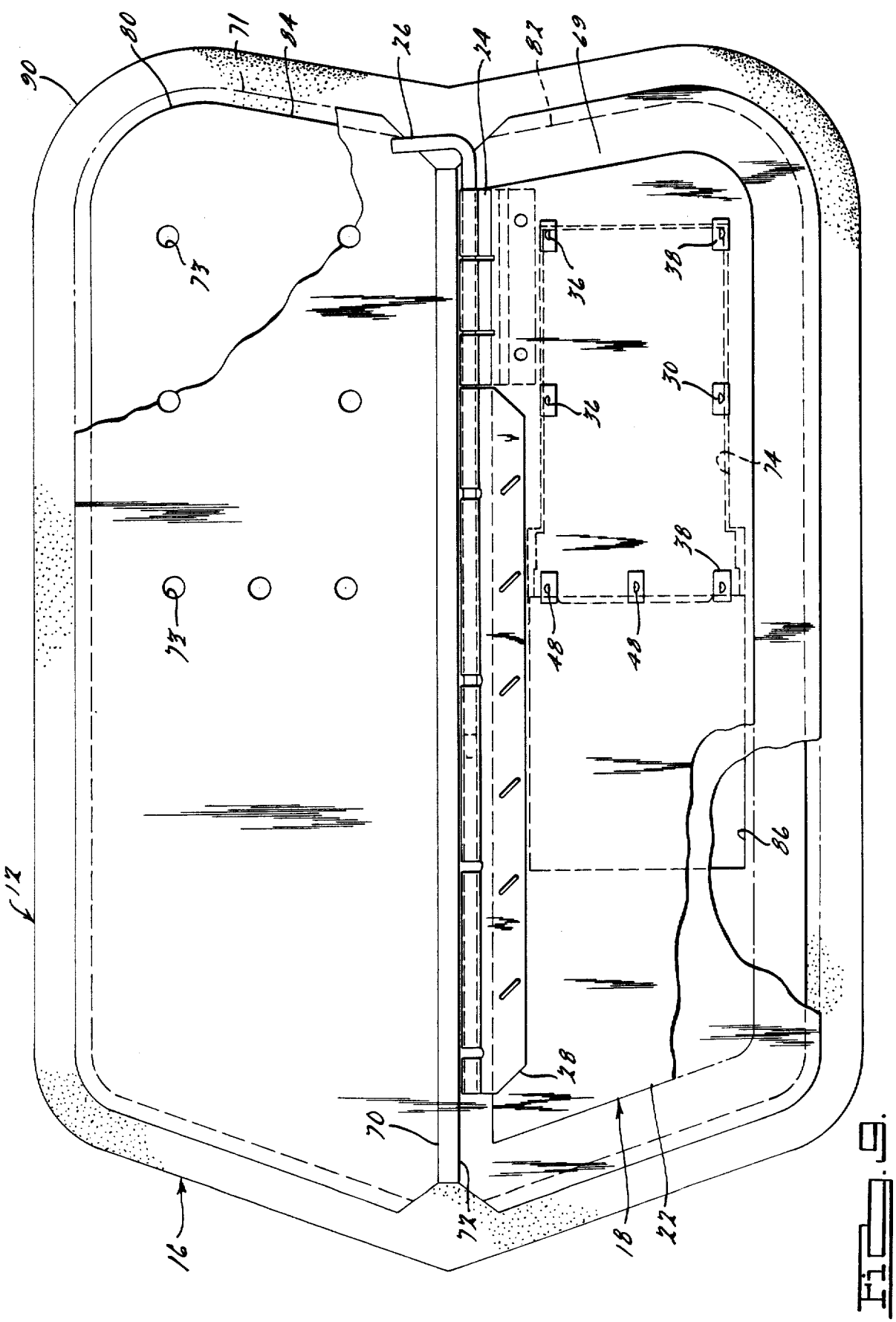
FIG. 9 is a view of the visor assembly in accordance with this invention shown in a condition before final assembly wherein the outer board is unfolded and particularly showing the center board and mirror which becomes sandwiched within the visor outer board.

Outer board assembly 16 includes outer board member 68 which is preferably formed from cardboard or another composite material and is scored along a pair of parallel lines 70 and 72 shown in FIGS. 9 and 10. Lines 70 and 72 define a pair of generally symmetrical leaves 69 and 71 and enable outer board member 68 to be folded onto itself in the assembled position. Outer board member leaf 69 defines central hole 74 which is slightly larger than mirror housing 34 and mirror guide 44 such that it will not interfere with that structure when the unit is assembled. Leaf 71 of outer board member 68 defines a plurality of holes 73 which provide clearance for extending posts 36 and 48.

A sheet of foam 80 is bonded to outer board member 68 and also defines a pair of leaves 82 and 84. Leaf 82 has a large central hole 86 which provides clearance for mirror retainer assembly 20 and also defines clearance area 88 which generally surrounds mirror 14 when it is withdrawn to the position shown in FIG. 2. Leaf 84 of foam 80 defines a plurality of holes 87 which provide clearance for posts 36 and 48. Cloth 90 covers foam 80 and defines a slit which enables mirror guide 44 to pass therethrough.

In an illustrative assembly process, mirror retainer assembly 20 is fastened to center board assembly 18 using clips 38. Thereafter, center board assembly 18 may be placed inside outer board assembly 16. Foam 80 and cloth 90 are placed in layers on outer board assembly 16. Preferably, cloth 90 is pulled tightly over the assembly and may be glued along the perimeter edge of outer board assembly 16 or otherwise secured thereto. Cloth 90 is preferably firmly bonded to outer board member 68 in clearance area 88 to provide a depression, best shown in FIG. 8, which provides clearance for mirror 14. Cloth 90 is clamped within channel 42 of mirror housing 34 by mirror guide 44. Cloth 90 is stretched across holes 87 of foam 90 such that these holes are not visible when the unit is completely assembled. Additionally, foam 80 preferably has a thickness approximately the same as the height of mirror housing 34 so that cloth 90 is stretched generally flat across the mirror housing such that its presence is not obvious to the user. FIG. 9 shows visor 12 in a partial stage of assembly. As shown therein, outer board assembly 16 is spread open and center board assembly 18 is inserted therein. Thereafter, leaves 69 and 71 of outer board member 68 are folded onto themselves, and assembly is completed by stitches or bonding agents around the perimeter edges of outer board assembly 16.

While the above description constitutes the preferred embodiments of the invention, it will be appreciated that the invention is susceptible to modification, variation, and change without departing from the proper scope or fair meaning of the accompanying claims.

What is claimed is:

1. A motor vehicle visor assembly comprising:
   an internal mirror housing defined by said visor assembly and a mirror guide defining a slot communicating with said internal mirror housing,
   a mirror coupled for movement in said internal mirror housing,
   said mirror movable to a first position wherein said mirror is coupled with said internal mirror housing and is stowed and enclosed by said visor assembly,
   a mirror retainer adjacent said slot, said retainer forming a guide for said mirror and including detent clip means acting upon said mirror for enabling said mirror to be retained by and released from said detent clip means,
   said mirror movable to a second position wherein said mirror is withdrawn from said visor assembly exposing said mirror and said mirror retained by said detent clip means, and
   said mirror movable to a third position wherein said mirror is detached from said detent clip means and is disconnected from said visor assembly.

2. The motor vehicle visor assembly according to claim 1 wherein said visor assembly further defines a clearance area which enables said mirror to be moved to said withdrawn position without interference with said visor.

3. The motor vehicle visor assembly according to claim 1 wherein said detent clip means comprises a spring clip which engages side edge surfaces of said mirror.

4. The motor vehicle visor assembly according to claim 3 wherein said mirror further comprises one or more notches which retain said mirror in either said stowed or extended positions.

5. A motor vehicle visor assembly comprising:
   a visor including:
      a center board,
      a mirror housing mounted to said center board defining an internal mirror cavity,
      a mirror retainer mounted to said center board and defining a slot communicating with said mirror cavity,
      a detent clip carried by said retainer and having a pair of ends disposed in said mirror cavity adjacent said slot,
      an outer board adapted to be folded onto said center board, said outer board defining a central hole surrounding said mirror housing,
      trim material covering said outer board, and a mirror including:
      a generally rectangular shaped flat plate mirror element,
      a bezel surrounding the edges of said mirror element and defining a perimeter edge which interacts with said detent means, said mirror movable to a first position wherein said mirror is coupled with said mirror housing and is stowed and enclosed by said visor,
   said mirror movable to a second position wherein said mirror is withdrawn from said visor exposing said mirror and said mirror retained by said detent clip,
   said mirror movable to a third position wherein said mirror is detached from said detent clip and is disconnected from said visor, and
   said bezel further defining a flange adapted to enable said mirror to be moved between said positions by a user.

6. The motor vehicle visor assembly according to claim 5 wherein said visor assembly further defines a clearance area which enables said mirror to be moved to said withdrawn position without interference with said visor.

7. The motor vehicle visor assembly according to claim 5 wherein said mirror further comprises one or more notches which retain said mirror in either said stowed or extended positions.

8. A motor vehicle visor assembly comprising:
   said visor assembly defining a pair of major planar surfaces with a slot located generally along a transverse centerline of one of said planar surfaces, said visor defining an internal mirror housing on one side of said slot, and defining a mirror clearance depression on the opposite side of said slot,
   a mirror coupled for movement in said internal mirror housing,
   said mirror movable to a first position wherein said mirror is coupled with said internal housing and is stowed and enclosed by said visor assembly,
   a mirror retainer mounted to said visor assembly and defining said slot, and
   a detent clip acting on edge surfaces of said mirror adjacent said slot and acting on said mirror for enabling said mirror to be retained by and released from said detent clip,
   said mirror movable to a second position wherein said mirror is withdrawn from said visor assembly exposing said mirror and said mirror is disposed generally within said depression and said mirror retained by said detent clip, and
   said mirror movable to a third position wherein said mirror is detached from and reconnectable to said visor.

* * * * *

UNITED STATES PATENT AND TRADEMARK OFFICE
CERTIFICATE OF CORRECTION

PATENT NO. : 4,711,483

DATED : December 8, 1987

INVENTOR(S) : Ronald S. Gulette et al

It is certified that error appears in the above-identified patent and that said Letters Patent is hereby corrected as shown below:

Column 2, line 56, "seated" should be --sealed--.

Column 6, line 19, "certerline" should be --centerline--.

Column 6, line 40, after "from" insert --said detent clip and is disconnectable from--.

Signed and Sealed this

Fifth Day of July, 1988

*Attest:*

DONALD J. QUIGG

*Attesting Officer*  *Commissioner of Patents and Trademarks*